US012663104B2

(12) United States Patent
McKaskle

(10) Patent No.: US 12,663,104 B2
(45) Date of Patent: Jun. 23, 2026

(54) CHAMFER RING FOR PIPE COUPLING

(71) Applicant: Hubbell Incorporated, Shelton, CT (US)

(72) Inventor: Brian Anthony McKaskle, Tulsa, OK (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 19/096,988

(22) Filed: Apr. 1, 2025

(65) Prior Publication Data

US 2025/0305601 A1 Oct. 2, 2025

Related U.S. Application Data

(60) Provisional application No. 63/573,152, filed on Apr. 2, 2024.

(51) Int. Cl.
F16L 19/02 (2006.01)
F16L 21/02 (2006.01)

(52) U.S. Cl.
CPC ....... F16L 19/0218 (2013.01); F16L 19/0206 (2013.01); F16L 21/02 (2013.01)

(58) Field of Classification Search
CPC ... F16L 37/091; F16L 37/092; F16L 37/0925; F16L 37/0926; F16L 37/0927; F16L 37/123; F16L 37/138; F16L 25/12; F16L 21/02
See application file for complete search history.

(56) References Cited

U.S. PATENT DOCUMENTS

| 3,282,610 A | * | 11/1966 | White | F16L 21/03 |
| | | | | 29/451 |
| 3,327,379 A | * | 6/1967 | Loydell | F16L 21/03 |
| | | | | 138/40 |
| 4,407,526 A | * | 10/1983 | Cicenas | F16L 37/0926 |
| | | | | 285/27 |
| 4,431,216 A | * | 2/1984 | Legris | F16L 37/0925 |
| | | | | 285/104 |
| 5,180,195 A | * | 1/1993 | Petroff | F16L 21/02 |
| | | | | 285/915 |

(Continued)

OTHER PUBLICATIONS

PCT/US2025/022440 International Search Report and Written Opinion dated May 30, 2025.

*Primary Examiner* — Aaron M Dunwoody
(74) *Attorney, Agent, or Firm* — Robinson + Cole LLP

(57) ABSTRACT

A pipe coupling includes an insertion sleeve with a body that has an outer surface and an opening that passes through the body. The body includes a cylindrical first section disposed between a second section and a third section. The first section has a maximum outer diameter of the body. The second section has a varying diameter along its length. The third section has a varying diameter along its length. The opening includes a first region with a constant inner diameter and a second region with a varying diameter. A maximum diameter of the second region is greater than the constant inner diameter. The insertion sleeve is assembled on the rigid stiffener with the second region positioned closer to the first O-ring than the first region. The maximum diameter of the second region is greater than an outer diameter of the first O-ring.

20 Claims, 6 Drawing Sheets

(56) References Cited

U.S. PATENT DOCUMENTS

| | | | | |
|---|---|---|---|---|
| 5,366,260 A * | 11/1994 | Wartluft | ............. | F16L 37/0925 |
| | | | | 285/341 |
| 5,524,940 A | 6/1996 | Wartluft | | |
| 5,692,785 A | 12/1997 | Wartluft et al. | | |
| 5,791,698 A * | 8/1998 | Wartluft | ............. | F16L 37/0925 |
| | | | | 285/179 |
| 5,921,588 A * | 7/1999 | Vogel | ................... | F16L 19/075 |
| | | | | 285/23 |
| 5,975,587 A | 11/1999 | Wood et al. | | |
| 6,050,613 A | 4/2000 | Wartluft | | |
| 6,371,522 B1 * | 4/2002 | Wolff | ..................... | F16L 21/03 |
| | | | | 285/345 |
| 6,877,777 B1 * | 4/2005 | Wartluft | ............. | F16L 37/0926 |
| | | | | 285/239 |
| 7,182,372 B2 * | 2/2007 | Wolff | ..................... | F16L 21/03 |
| | | | | 285/374 |

| | | | | |
|---|---|---|---|---|
| 10,072,783 B2 * | 9/2018 | Gledhill | ................ | F16L 37/091 |
| 10,550,972 B2 | 2/2020 | Goble et al. | | |
| 11,060,647 B2 | 7/2021 | Jordan et al. | | |
| 2004/0262920 A1 * | 12/2004 | Le Quere | ........... | F16L 37/0925 |
| | | | | 285/319 |
| 2008/0197622 A1 * | 8/2008 | Schreckenberg | ..... | F16L 19/086 |
| | | | | 285/45 |
| 2012/0306118 A1 * | 12/2012 | Hayashi | ................. | B29C 45/44 |
| | | | | 264/249 |
| 2013/0062877 A1 * | 3/2013 | Hayashi | ................ | F16L 37/091 |
| | | | | 285/81 |
| 2015/0260324 A1 * | 9/2015 | Raper | ................ | F16L 37/0926 |
| | | | | 285/370 |
| 2016/0327196 A1 * | 11/2016 | Gledhill | ................ | F16L 37/091 |
| 2021/0071793 A1 * | 3/2021 | Kluss | ..................... | B25B 27/10 |
| 2022/0307636 A1 * | 9/2022 | Diao | .................. | F16L 37/0925 |
| 2024/0280198 A1 * | 8/2024 | Perherin | .............. | F16L 27/113 |

* cited by examiner

CHAMFER RING FOR PIPE COUPLING

CROSS-REFERENCE TO RELATED APPLICATION

This application claims the benefit of U.S. Provisional Application No. 63/573,152, filed Apr. 2, 2024, the entire contents of which are incorporated herein by reference in its entirety.

FIELD

The present disclosure relates to a ring for use with a pipe coupling. More particularly, the present disclosure relates to a ring with a pre-manufactured chamfer that will eliminate the need to chamfer the end of the pipe after it has been cut perpendicular to the pipe axis.

BACKGROUND

Thermoplastic piping is generally produced by extrusion of long lengths which are then cut, often times at the field installation location, to a desired length or lengths. The thermoplastic pipe may be composed of a variety of materials, such as polyvinyl chloride (PVC), polyethylene (PE), or acrylonitrile-butadiene styrene (ABS).

During field installation, the thermoplastic pipe is cut perpendicular to the axis of the pipe to a desired length. The face of the pipe end is ideally flat, although because of many conditions and situations encountered in the field, this may not always be the case.

Stab-on couplings can provide a seal between the coupling and the inside circumference of the plastic pipe. Before the pipe end is inserted into a fitting, it has been found to be desirable to provide a beveled edge to the pipe end.

It is desirable to have a chamfer or bevel on both the outside and on the inside edges. This allows for easier installation into the socket depths of the coupling and will also allow the leading front edge of the plastic pipe to pass over the O-rings or other seals without unseating them.

In the past, a number of measures have been taken to achieve this result. Chamfering or beveling of pipe ends has been performed by shaving with a blade. Technicians in the field may create the chamfer or bevel on the pipe using a tool, e.g., U.S. Pat. No. 5,853,272. The tool may form a chamfer or bevel on the inside and/or outside of at least one end of a plastic pipe.

In some instances, a technician may use the tool improperly, which may result in an improperly cut chamfer or bevel. An imprecise cut on the end of the pipe may disturb the O-rings or other seals as the pipe is inserted, which may create leaks when fluid is passed through the pipe.

Notwithstanding the foregoing, it would be desirable to eliminate the requirement for the technician to place a beveled edge on a plastic pipe end prior to engaging a stab-on coupler. It would also be desirable to provide an insertion sleeve for a coupler to eliminate the need to chamfer the end of a pipe.

SUMMARY

Various examples of the present disclosure can overcome various of the aforementioned and other disadvantages associated with known insertion sleeves for pipe couplings and offer new advantages as well.

According to one aspect of various examples of the present disclosure there is provided an insertion ring manufactured with a chamfer sufficient to permit the insertion ring to move past an O-ring.

According to another aspect of various examples of the present disclosure, there is provided an insertion sleeve and stiffener for a plastic pipe coupling. The insertion sleeve may be pre-installed on a rigid stiffener of a plastic pipe coupling.

According to another aspect of various examples of the present disclosure, there is provided an insertion sleeve with a chamfered inner surface.

According to another aspect of various examples of the present disclosure, there is provided an insertion ring having a chamfered end and a length along an axial direction that is less than a maximum outer diameter.

According to another aspect of various examples of the present disclosure, there is provided a pipe coupling that includes a rigid stiffener, a first O-ring, a second O-ring, and an insertion sleeve. The rigid stiffener is disposed in a fixed position within a shell and has an external diameter that is less than the internal diameter of a pipe that may be secured by said coupling. The stiffener includes a first groove and a second groove spaced apart from the first groove. The first O-ring is positioned in the first groove and the second O-ring is positioned in the second groove. The insertion sleeve is movably coupled to the rigid stiffener. The insertion sleeve includes a body with an outer surface and an opening that passes through the body. The body includes a cylindrical first section disposed between a second section and a third section. The first section has a maximum outer diameter of the body. The second section has a varying diameter along its length. The third section has a varying diameter along its length. The opening includes a first region with a constant inner diameter and a second region with a varying diameter. A maximum diameter of the second region is greater than the constant inner diameter. The insertion sleeve is assembled on the rigid stiffener with the second region positioned closer to the first O-ring than the first region. The maximum diameter of the second region is greater than an outer diameter of the first O-ring.

In some forms, a) the first groove is spaced apart from the second groove by a distance greater than a length of the first region; b) the second section includes a first outer diameter and a second outer diameter greater than the first diameter; c) the second outer diameter is less than the maximum outer diameter; and/or d) a radial surface extends between the first section and the second section, and wherein the radial surface is configured to be contacted by the pipe.

In some forms, a) the third section includes a first chamfer and the second region includes a second chamfer; b) the first chamfer and the second chamfer converge toward one another; c) the first region extends at least partially across the second section and the first section; d) the second region extends at least partially across the first section and the third section; e) a gripper with at least one tooth that can contact an outer surface of the pipe; f) the at least one tooth is formed at an incline with a first angle, the third section is formed at an incline with a second angle, and the first angle is equivalent to the second angle; g) the second region is inclined relative to an outer surface of the rigid stiffener with an angle between 15° and 30°; h) the maximum outer diameter of the body is equal to an outer diameter of the pipe; and/or i) a length of the body along an axial direction is less than the maximum outer diameter.

According to another aspect of various examples of the present disclosure, there is provided an insertion sleeve for use with a pipe coupling. The insertion sleeve includes a body having an outer surface and an opening passing through the body. The body includes a cylindrical first section disposed between a second section and a third section. The first section has a maximum outer diameter of the body. The second section has a varying diameter along its length. The third section has a varying diameter along its length. The opening includes a first region with a constant inner diameter and a second region with a varying diameter. A maximum diameter of the second region is greater than the constant inner diameter. The insertion sleeve may be assembled along a rigid stiffener of the pipe coupling. The maximum diameter of the second region can be greater than an outer diameter of an O-ring received on the rigid stiffener. The body may be movably coupled to the rigid stiffener.

In some forms, a) the second section includes a first outer diameter and a second outer diameter greater than the first diameter; b) the second outer diameter is less than the maximum outer diameter; c) a radial surface extends between the first section and the second section; and/or d) the radial surface is configured to be contacted by a pipe.

In some forms, a) the third section includes a first chamfer and the second region includes a second chamfer; b) the first chamfer and the second chamfer converge toward one another; c) the first region extends at least partially across the second section and the first section; d) the second region extends at least partially across the first section and the third section; e) the second region is inclined relative to the first region with an angle between 15° and 30°; and/or f) the maximum diameter of the second region is greater than the axial length of the body measured between the second section and the third section.

According to another aspect of various examples of the present disclosure, there is provided a method of connecting a pipe to a pipe coupling. The method includes preassembling an insertion sleeve on a stiffener of the pipe coupling. The insertion sleeve includes a leading end and a trailing end. The leading end including an internal chamfer and the trailing end includes a radial surface. The method further includes moving a pipe into contact with the radial surface and forcing the insertion sleeve to move along the stiffener. The internal chamber may allow the insertion sleeve and the pipe to move past an O-ring coupled to the stiffener without moving the O-ring.

In some forms, a) the insertion sleeve includes a body having an outer surface and an opening passing through the body; b) the body includes a cylindrical first section disposed between a second section and a third section; c) the first section has a maximum outer diameter of the body; d) the second section having a varying diameter along an axial length; e) the third section having a varying diameter along the axial length; f) the opening includes a first region with a constant inner diameter and a second region with a varying diameter; and/or g) a maximum diameter of the second region is greater than the constant inner diameter.

In certain forms, a) the second section includes a first outer diameter and a second outer diameter greater than the first diameter; b) the second outer diameter is less than the maximum outer diameter; c) a radial surface extends between the first section and the second section; d) the radial surface is configured to be contacted by the pipe; e) the first region extends at least partially across the second section and the first section; and/or f) the second region extends at least partially across the first section and the third section.

In certain forms, a) a radial surface extends between the first section and the second section; b) the radial surface is oriented perpendicular to the first section; c) the third section includes a first chamfer and the second region includes a second chamfer; d) the first chamfer and the second chamfer converge toward one another; and/or e) the second region is inclined relative to the first region with an angle between 15° and 30°.

In some forms, the method also includes a) moving the trailing end of the insertion sleeve past the O-ring; b) the O-ring contacts an inner surface of the pipe and forms a seal to limit the flow of fluid between the inner surface of the pipe and an outer surface of the stiffener; c) moving the into the pipe coupling until the insertion sleeve contacts a hub; d) the insertion sleeve is disposed entirely past the O-ring; e) the pipe is disposed radially between the O-ring and a gripper; f) the gripper limits movement of the pipe out of the pipe coupling; g) the O-ring is a first O-ring and a second O-ring is coupled to the stiffener and spaced apart from the first O-ring; and/or h) moving the trailing edge past the first O-ring before the leading edge reaches the second O-ring.

The disclosure herein should become evident to a person of ordinary skill in the art given the following enabling description and drawings. The drawings are for illustration purposes only and are not drawn to scale unless otherwise indicated. The drawings are not intended to limit the scope of the disclosure. The following enabling disclosure is directed to one of ordinary skill in the art and presupposes that those aspects within the ability of the ordinarily skilled artisan are understood and appreciated.

BRIEF DESCRIPTION OF THE DRAWINGS

Various aspects and advantageous features of the present disclosure will become more apparent to those of ordinary skill when described in the detailed description of preferred examples and reference to the accompany drawing wherein.

DETAILED DESCRIPTION

Figure 1:
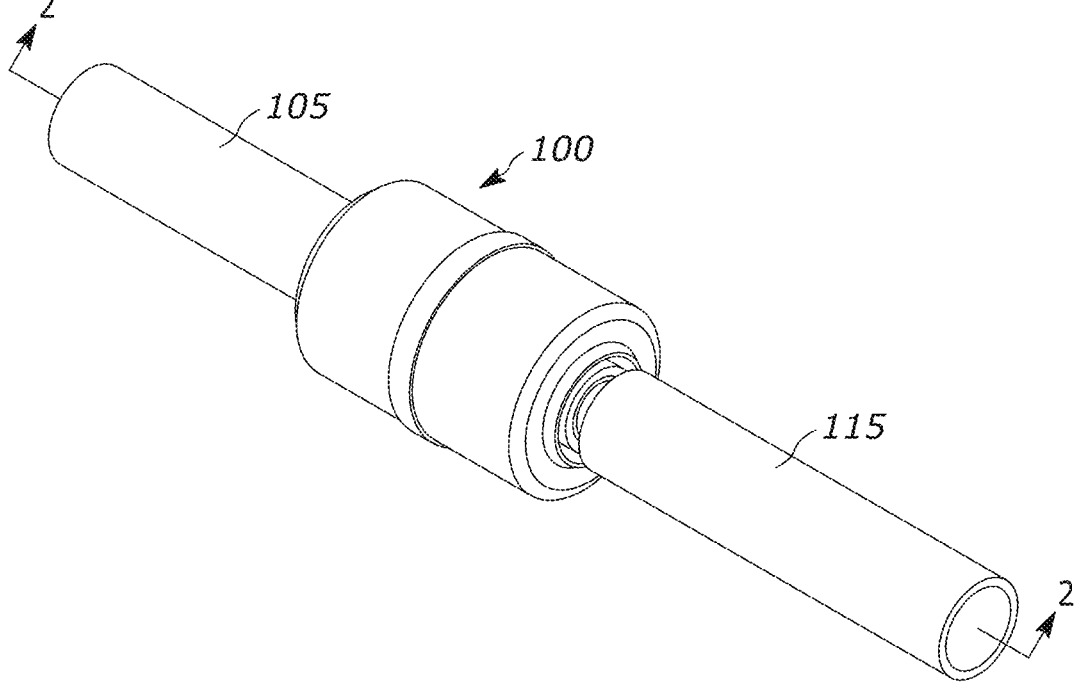
FIG. 1 is a perspective view of a pipe coupling.

FIG. 1 illustrates a coupler device 100 that may be used to join pipe segments together. For example, the coupler device 100 may be a substantially cylindrical body with openings on either end, which may permit the coupler device 100 to join two pipe segments together. In the illustrated example, a first pipe 105 may include a leading end 110 (see e.g., FIG. 4) inserted into the coupler device 100 and a second pipe 115 (see e.g., FIG. 2) is shown spaced apart from the coupler device 100 so that a leading end 120 of the second pipe 115 is spaced apart from the coupler device 100 so that the coupler device 100 is in a partially assembled position.

Figure 2:
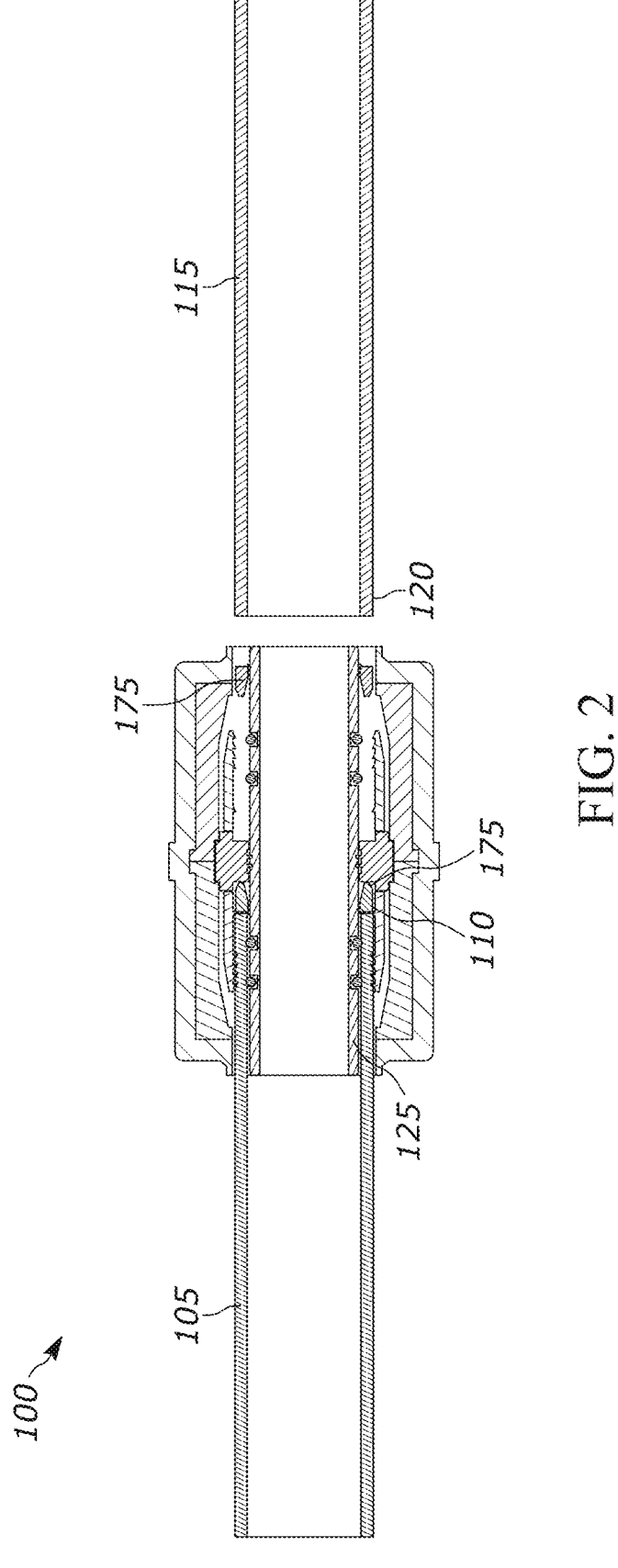
FIG. 2 is a cross-sectional view of the pipe coupling of FIG. 1, viewed along section 2-2.
Figure 3:
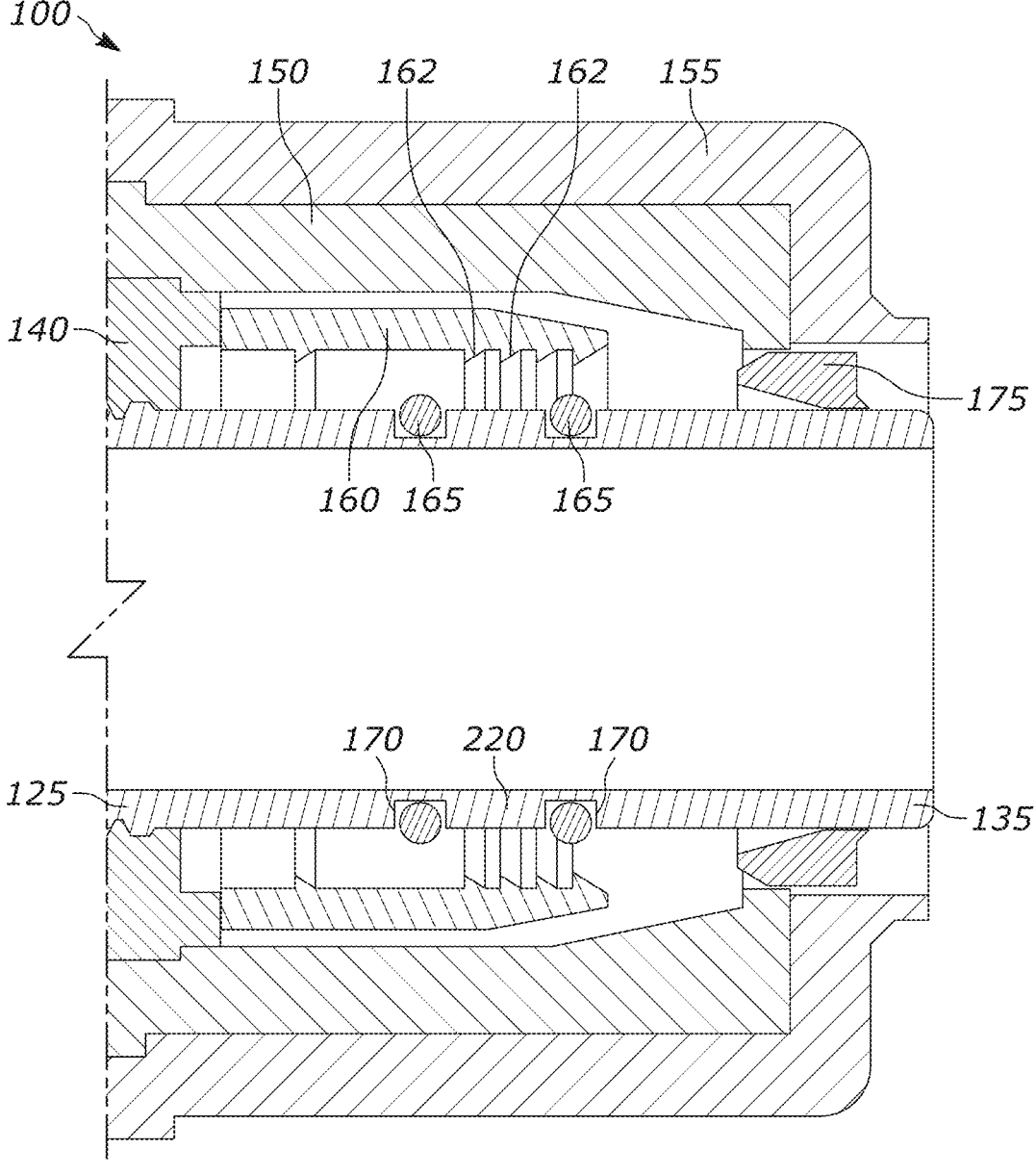
FIG. 3 is a first detail view of the pipe coupling of FIG. 2, with a pipe disconnected from the coupling.
Figure 4:
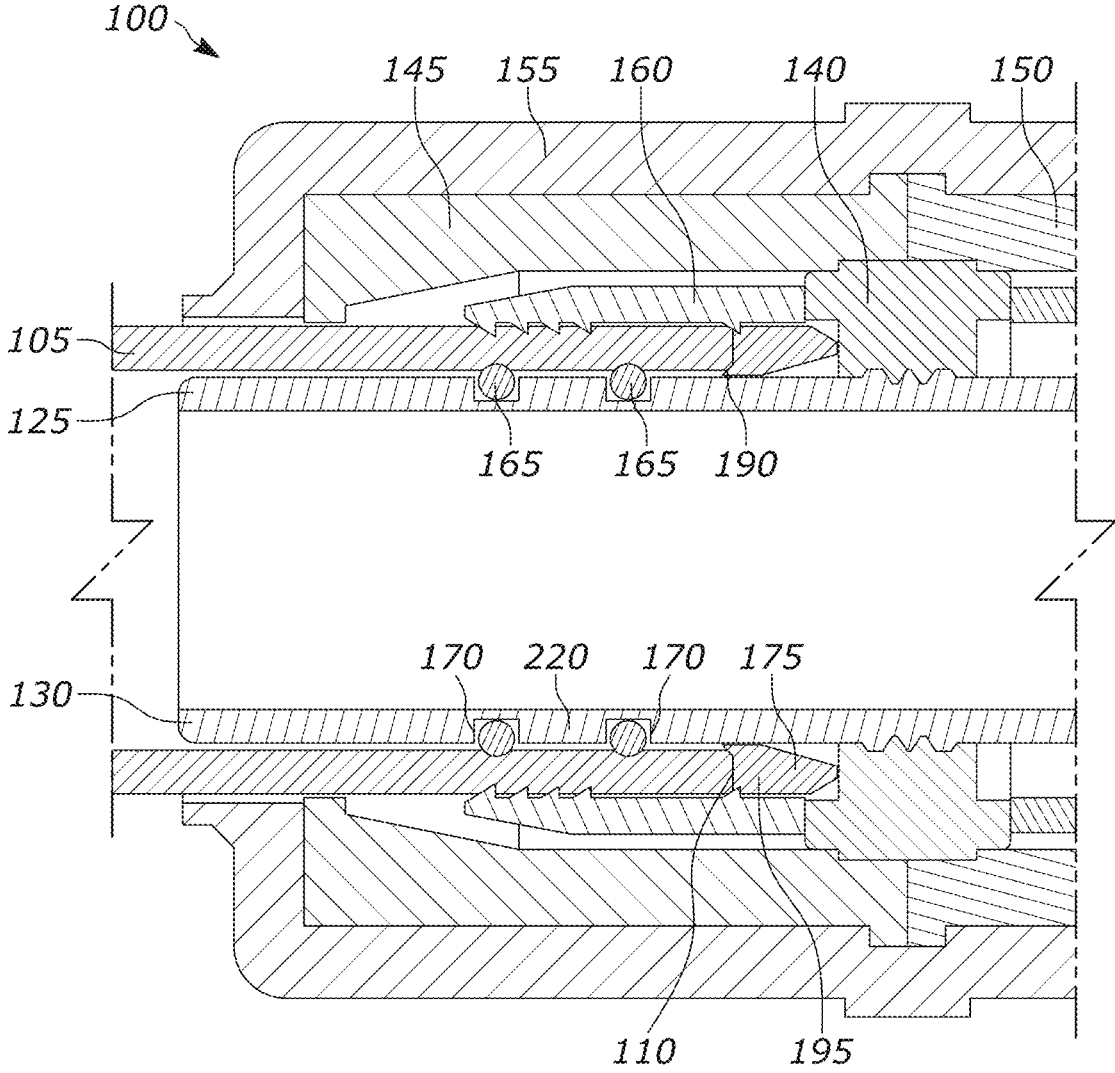
FIG. 4 is a second detail view of the pipe coupling of FIG. 2, with the pipe connected to the coupling.

As shown in FIGS. 2 to 4, the coupler device 100 may include a stiffener 125. In the illustrated example, the stiffener 125 may be substantially hollow and may extend the length of the coupler device 100. The stiffener 125, constructed of a rigid material, has opposed ends 130 and 135 that protrude up to open ends on the coupler device 100.

In some forms, the stiffener 125 has an external diameter less than the internal diameter of the first or second pipe 105, 115 to permit each pipe 105, 115 to be slipped over the respective end of the stiffener 125. The stiffener 125 may be secured within the coupler device 100 (e.g., by a hub member 140).

The hub member 140 may be secured radially within the coupler device 100 by a hollow and elongated rigid coupler shell comprised of shell halves 145 and 150. The shell has openings at each end which communicate via separate internal narrowing portions with a separate, straight internal portion. A protective outer body 155 surrounds the shell halves 145 and 150.

In some forms, the pipes 105, 115 may be held in place by backward oriented grippers 160 once the pipes 105, 115 have been fully inserted into the coupler device 100. The grippers 160 may be positioned within the outer body 155, which sealingly engages an outside surface of the pipe(s) 105, 115.

In some forms, one or more sealing members 165 may be disposed on the outer surface of the stiffener 125 to seal against an inner surface of at least one of the pipes 105, 115. In the illustrated example, there may be four total sealing members with two sealing members 165 may be disposed on either side of the stiffener 125. Although in other examples, there may be a different number of sealing members 165 and/or the sealing members 165 may be arranged in a different configuration.

In some forms, the sealing members 165 may be O-rings that are at least partially received within a groove 170 on the outer surface of the stiffener 125. For example, the stiffener 125 may include four grooves 170, one for each O-ring 165.

Figure 5:
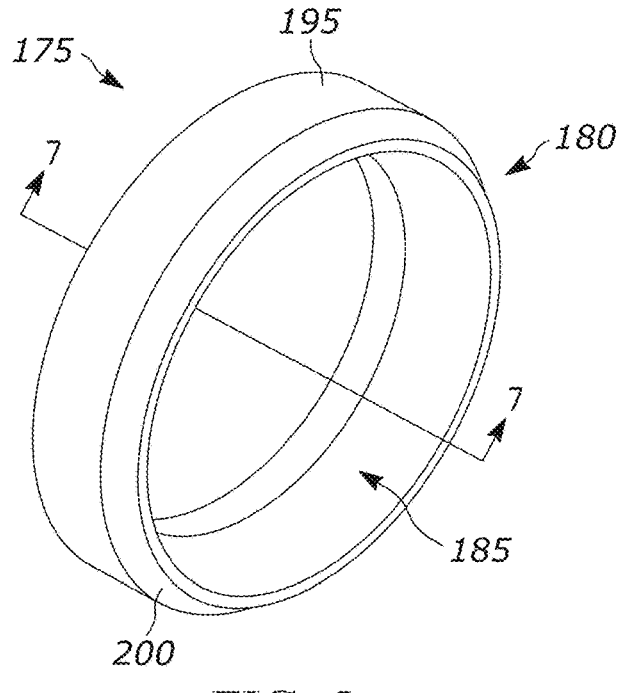
FIG. 5 is a perspective view of a chamfer ring used with the pipe coupling.
Figure 6:
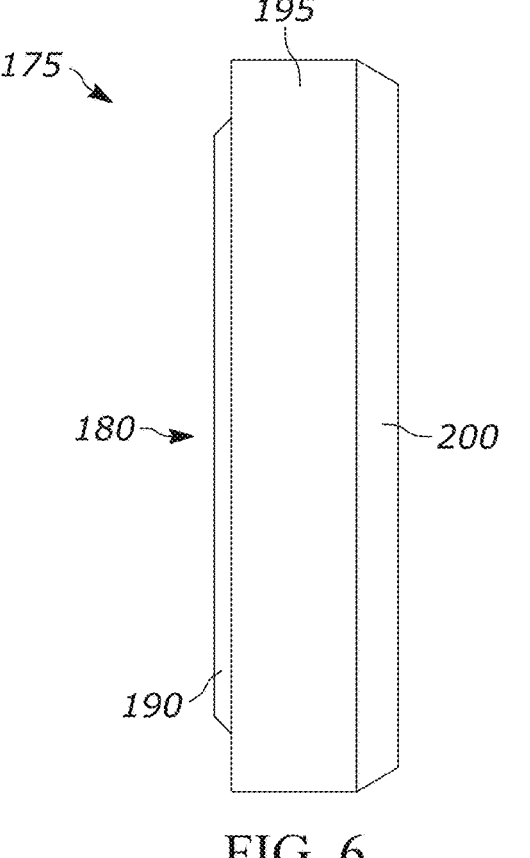
FIG. 6 is a side view of the chamfer ring of FIG. 5.
Figure 7:
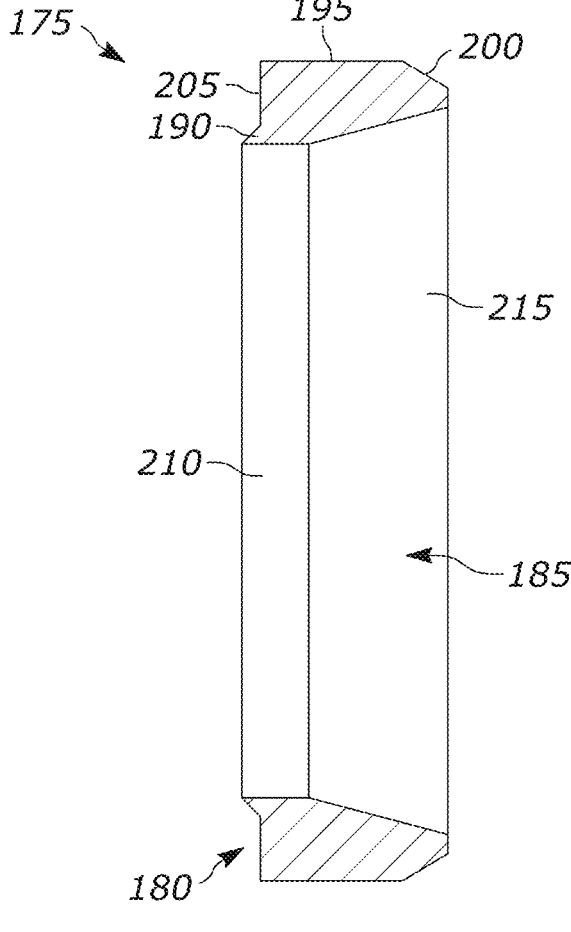
FIG. 7 is a cross-sectional view of the chamfer ring of FIG. 5, viewed along section 7-7.

As shown in FIGS. 5 to 7, an insertion sleeve 175 may include a body 180 with a hollow center 185. As described in more detail below, the insertion sleeve 175 may be used with the stiffener 125.

As shown in FIG. 6, the body 180 of the insertion sleeve 175 may include a first section 190, a second section 195, and a third section 200. Each of the sections may be differentiated by a change in outer diameter. The illustrated body 180 may be formed in one piece, although other examples may include separate pieces connected together for each of the sections.

In some forms, the second section 195 may include the largest outer diameter and may be disposed between the first section 190 and the third section 200. In other examples, a different section may include the largest outer diameter. In the illustrated example, the second section 195 may have a substantially constant outer diameter, and may be formed as a substantially cylindrical section. However, other examples may include a second section 195 with a varying diameter.

In certain forms, a diameter of the body 180 may be greater than a length of the body 180. For example, an axial length of the body 180 may be less than an outer diameter of the second section 195.

The third section 200 may extend from the second section 195 on a leading end of the body 180 (e.g., the end that is first inserted into the coupler device 100). In the illustrated example, the third section 200 may be chamfered so that its outer diameter decreases from the second section 195 and toward the leading end. The insertion sleeve 175 may be referred to as a chamfer ring.

The first section 190 may extend from the second section 195 on a trailing end of the body 180 (e.g., the end opposite to the leading end). In the illustrated example, the first section 190 is beveled and includes an outer diameter that decreases in an axial direction away from the second section 195.

In certain forms, the maximum outer diameter of the first section 190 may be less than the outer diameter of the second section 195. For example, there may be a step between the first section 190 and the second section 195, as opposed to the edge forming the transition between the second and third sections 195, 200. A radial surface 205 may extend parallel to the radial direction of the body 180 between the first and second sections 190, 195. As explained in more detail below, the length of the radial surface 205 may be substantially equal to a thickness of the pipes 105, 115.

As shown in FIG. 7, the center 185 of the insertion sleeve 175 may form a passageway that extends between the leading and trailing ends. The diameter of the center 185 (e.g., the inner diameter of the insertion sleeve 175) may be at least as large as the stiffener 125 (e.g., to permit the insertion sleeve 175 to fit around the stiffener 125).

In some forms, the center 185 may have a first region 210 and a second region 215. The first region 210 and the second region 215 may not correspond to the first and second sections 190, 195. For example, the first region 210 and/or the second region 215 may overlap with one or more of the sections of the outer perimeter of the body 180.

In certain forms, the first region 210 may be formed proximate to the trailing edge of the body 180. The illustrated first region 210 may pass between the first section 190 and the second section 195. For example, the first region 210 may extend along the entire length of the first section 190 and may extend along a part of the second section 195. As illustrated, the first region 210 may terminate before a midway point of the second section 195 (e.g., closer to the trailing end), although in other examples, the first region 210 may extend up to or past the midway point.

In certain forms, the first region 210 may include a constant width. For example, the first region 210 may have a substantially annular shape along the axial direction of the body 180. However, other examples of the first region 210 may have a varying width along the axial direction. In one form, the inner diameter of the body 180 in the first region 210 may be greater than the axial length of the body 180.

In certain forms, the second region 215 may extend from the first region to the leading end of the body 180. The illustrated second region 215 may pass between the second section 195 and the third section 200. For example, the second region 215 may extend along the remaining length of the second section 195 (e.g., the length not occupied by the first region 210) and may extend along the entire length of the third section 200. In other examples, the second region 215 may extend a different length (e.g., based on a length of the first region 210 and/or by not extending entirely along the length of the third section 200).

In certain forms, the second region 215 may have a varying width along its length. For example, the width of the second region 215 (e.g., measured along the radial direction) may change along the axial direction (e.g., be a frusto-conical shape). In the illustrated example, the width of the second region 215 may increase toward the leading end (e.g., away from the first region 210.

However, other examples of the second region 215 may include a constant width. The constant width may be the same as the width of the first region 210, or the width of the second region 215 may be different (e.g., larger or smaller) than the width of the first region 210 with a stepped region formed between the two. In still other examples, the width of the second region 215 may vary in a different manner (e.g., decrease toward the leading end and/or have a maximum width between the first region 210 and the leading end).

In one form, the maximum width of the second region 215 (e.g., the maximum inner diameter of the body 180) may be less than the minimum outer width of the body 180. For example, the third section 200 is chamfered so that its minimum outer width is spaced apart from the maximum outer width of the second region 215. However, other examples of the third section 200 may be beveled so that the minimum width of the third section 200 and maximum width of the second region 215 are equivalent.

Returning to FIG. 3, the coupler device 100 may be assembled with the O-rings 165 pre-installed in the grooves 170. The insertion sleeve 175 may also be pre-installed on the stiffener 125. In the illustrated example, the pre-installed insertion sleeve 175 may be spaced apart from the O-rings 165. For example, the O-rings 165 may be positioned closer to a middle of the stiffener 125 than the insertion sleeve 175 (which may be positioned closer to an end of the stiffener 125).

In this position, the first region 210 may be disposed against the outer surface of the stiffener 125. The inner diameter of the first region 210 may be substantially similar to the outer diameter of the stiffener 125 so that the insertion sleeve 175 grips the stiffener 125. The second region 215 may be spaced apart from the outer surface of the stiffener 125. For example, a spacing between the surface of the second region 215 and the stiffener 125 may increase toward the leading end (e.g., end proximate to the O-ring 165) as a result of the frusto-conical shape.

In some forms, the angle between the surface of the stiffener 125 and the second region 215 may be between about 1° and about 90°. In some forms, the angle between the surface of the stiffener 125 and the second region 215 may be between about 5° and about 45°. In some forms, the angle between the surface of the stiffener 125 and the second region 215 may be between about 10° and about 30°. In some forms, the angle between the surface of the stiffener 125 and the second region 215 may be between about 15° and about 25°.

When the first or second pipe 105, 115 is installed into the coupler device 100, the respective leading end 110, 120 does not need to be cut (e.g., chamfered) to be installed. As shown in FIG. 4, the first pipe 105 may contact the respective insertion sleeve 175, which is manufactured with an appropriate chamfer.

The leading end 110 of the first pipe 105 may contact the radial surface 205 of the insertion sleeve 175. This contact may push the insertion sleeve 175 toward the hub member 140. The leading end 110 of the first pipe 105 may remain in contact so that there is substantially no relative movement between the first pipe 105 and the insertion sleeve 175. Although not explicitly shown or described, the second pipe 115 and its respective insertion sleeve 175 may operate in substantially the same manner.

In some forms, the first pipe 105 may rest on the first section 190 of the respective insertion sleeve 175. This may slightly space the first pipe 105 away from the outer surface of the stiffener 125. As described in more detail below, this may assist the insertion of the first pipe 105 (or the second pipe 115) into the coupler device 100.

In certain forms, the first section 190 may not substantially extend along an axial length. An end of the first pipe 105 may partially rest of the first section 190, but the first section 190 may not substantially extend along an inner surface of the first pipe 105. Although the first section 190 may provide some space between the end of the first pipe 105 and the stiffener 125, the first section does 190 does not substantially space the first pipe 105 apart from the stiffener so that it is unable to be received within the outer body 155 or respective shell 145.

In some forms, the thickness of the first pipe 105 may be similar to the thickness of the insertion sleeve 175. For example, the thickness of the first pipe 105 may be less than the thickness of the insertion sleeve 175. The combination of the thickness of the first section 190 and the first pipe 105 may be substantially equal to the thickness of the insertion sleeve 175 proximate to the second section (e.g., the maximum thickness of the insertion sleeve 175).

When the first pipe 105 is in contact with the radial surface 205, the resulting structure may include a substantially uniform outer surface. This may be beneficial when inserting the first pipe 105 because there are substantially no obstructions on the outer surface. For example, the outer diameter of the first pipe 105 matching the outer diameter of the second section 195 creates substantially no protrusions or other obstructions that could create an interference as the first pipe 105 is inserted into the coupler device 100.

In certain forms, the first section 190 may be constructed from an at least partially flexible material. The first pipe 105 may compress the first section 190 to permit the outer surface of the first pipe 105 and the outer surface of the second section 195 to form substantially flush outer surfaces (see e.g., FIG. 4).

As the first pipe 105 is inserted, it is pushed toward the gripper 160 and the O-rings 165. The illustrated gripper 160 and O-ring 165 may be aligned along a radial direction at and end of the gripper 160 and O-ring 165. For example, the leading end of the insertion sleeve 175 may reach the gripper 160 and the O-ring 165 at substantially the same time as the first pipe 105 is inserted.

In some forms, the space between the gripper 160 and the outermost surface of the stiffener 125 may be approximately the thickness of the first pipe 105. The first pipe 105 may compress the O-ring 165 when in contact with the O-ring 165 so that the first pipe 105 remains able to pass between the stiffener 125 and the gripper 160. Because the first section 190 does not substantially extend along the inner surface of the first pipe 105, it does not substantially increase the spacing of the outer surface of the first pipe 105 from the stiffener 125 such that can still pass beneath the gripper 160.

The gripper 160 may have teeth 162 which may help secure the first pipe 105 within the coupler device 100. The teeth 162 may be oriented in a backwards direction (e.g., with an inclined portion facing the away from the hub portion 140. In some forms, the incline of each tooth may be substantially similar to the incline of the outer surface of the third section 200. The similar incline between the teeth 162 and third section 200 may permit the insertion sleeve 175 to slide past the gripper 160 and limit the resistance to insertion.

The inclination of the second region 215 may assist in inserting the first pipe 105 beyond the O-rings 165. For example, the length of the second region 215 (e.g., measured in the axial direction) and the inclination of the second region 215 (e.g., establishing a frusto-conical region) may make the section region longer and/or wider than an individual O-ring 165.

For example, an outermost diameter of the second section 215 (e.g., at the leading end) may be further spaced from the outer surface of the stiffener 125 than the outermost diameter of the O-ring 165 is spaced from the outermost surface of the stiffener 125. In this way, at least a portion of the insertion sleeve 175 may pass over an O-ring 165 without contacting or otherwise disturbing the O-ring 165.

As the distance between the second section 215 and the outer surface of the stiffener 125 and/or the first O-ring 165 decreases, and thus the second section 215 contacts the O-ring 165, the ramped structure of the second section 215 may permit the insertion sleeve 175 to move past the O-ring 165 without pushing the O-ring 165 out of its respective groove 170. Once the leading end of the insertion sleeve 175 is past the O-ring 165, the remainder of the insertion sleeve 175 and the first pipe 105 may move past the O-ring 165 without pushing the O-ring 165 out of the groove 170.

In this way, the insertion sleeve 175 may be manufactured with a desired inclination that permits it to move past the O-ring 165 without disturbing the position of the O-ring 165 and compromising the seal. A technician is not required to chamfer the first pipe 105, which could result in an imprecise chamfer that could disturb the O-ring 165 as the pipe is inserted.

In some forms, the grooves 170 may be spaced apart from one another so that a discontinuous section 220 of the stiffener 125 is disposed between them. The discontinuous section 220 may have the same outer diameter as portions of the stiffener 125 on the other side of either groove 170.

The length of the discontinuous section 220 may be greater than the length of the first region 210 and/or the first section 190 of the insertion sleeve 175. For example, the axial length of the first region 210 (e.g., the portion that may contact the stiffener 125) is less than an axial length of the stiffener 125. When the insertion sleeve 175 passes over the respective outermost O-ring 165 (e.g., leftmost O-ring 165 illustrated in FIG. 4), the first region 210 may return toward its initial position in contact with the stiffener 125. The first pipe 105 may compress the outermost O-ring 165 into the groove 170 so that the inner diameter of the first pipe 105 and the inner diameter of the first region 210 may continue to be positioned proximate to the outer surface of the stiffener 125. This may permit the insertion sleeve 175 to reset and be positioned to pass over the second O-ring 165. The second region 215 may assist in traversing the second O-ring 165 without disturbing the second O-ring 165 from its groove 170 is a similar way as the first O-ring 165.

Once the insertion sleeve 175 passes over the second O-ring 165, it may continue to move until it contacts the hub member 140. In this position, the leading end 110 of the first pipe 105 may be positioned inside of the second O-ring 165 so that both O-rings 165 contact an inner surface of the first pipe 105. The O-rings 165 may form a seal to limit the flow of fluid (e.g., gas) between the inner surface of the first pipe 105 and the outer surface of the stiffener 125.

In some forms, the insertion sleeve 175 may act as an extension of the first pipe 105 without substantially affecting the position of the first pipe 105. As described above, the outer surfaces of the insertion sleeve 175 and the first pipe 105 may be substantially aligned with one another. Additionally, the insertion sleeve 175 may not substantially extend along the inner surface of the first pipe 105. In this way, the insertion sleeve 175 does not substantially raise the first pipe 105 away from the stiffener 125. This helps the first pipe 105 fully compress the O-rings 165 to create a seal between the first pipe 105 and the stiffener 125.

In certain forms, an insertion sleeve 175 with a length less than a diameter may be cheaper to manufacture because material forming an elongated length is not needed. Using a shorter length for the insertion sleeve 175 may also avoid difficult manufacturing processes that require forming an insertion sleeve 175 with substantially small thickness so that it could fit between the first pipe 105 and the stiffener 125. To avoid substantially displacing the first pipe 105, as described above, an elongated portion would need to be thin enough to avoid substantially changing the distance between the outer surface of the stiffener 125 and the outer surface of the first pipe 105, which may expensive and/or difficult to manufacture.

Although the above description and associated figures generally describe the first pipe 105, the same description is equally applicable for inserting the second pipe 115 into the coupler device 100.

As described above, the coupler device 100 with the insertion sleeves 175 and the O-rings 165 may be pre-positioned on the stiffener 125 prior to reaching the technician. For example, the coupler device 100 may be assembled with the O-rings 165 positioned within the respective groove 170 and the insertion sleeves 175 positioned at an end of the stiffener 125 spaced apart from the O-rings 165. The coupler device 100 may then be shipped to a technician for use in the field. The technician may insert the first and second pipes 105, 115 into the coupler device 100 without needing to cut and chamfer the respective leading ends 110, 120.

One of ordinary skill will appreciate that the exact dimensions and materials are not critical to the disclosure and all suitable variations should be deemed to be within the scope of the disclosure if deemed suitable for carrying out the objects of the disclosure.

One of ordinary skill in the art will also readily appreciate that it is well within the ability of the ordinarily skilled artisan to modify one or more of the constituent parts for carrying out the various examples of the disclosure. Once armed with the present specification, routine experimentation is all that is needed to determine adjustments and modifications that will carry out the present disclosure.

The above examples are for illustrative purposes and are not intended to limit the scope of the disclosure or the adaptation of the features described herein. Those skilled in the art will also appreciate that various adaptations and modifications of the above-described preferred examples can be configured without departing from the scope and spirit of the disclosure. Therefore, it is to be understood that, within the scope of the appended claims, the disclosure may be practiced other than as specifically described.

What is claimed is:

1. A pipe coupling comprising:

a rigid stiffener in a fixed position within a shell, said stiffener having an external diameter less than the internal diameter of a pipe configured to be secured by said coupling, wherein the stiffener includes a first groove and a second groove spaced apart from the first groove;

a first O-ring positioned in the first groove and a second O-ring positioned in the second groove;

an insertion sleeve movably coupled to the rigid stiffener, the insertion sleeve includes a body having an outer surface and an opening passing through the body, wherein, the body includes a cylindrical first section disposed between a second section and a third section, the first section has a maximum outer diameter of the body, the second section having a varying diameter along its length, and the third section having a varying diameter along its length, the opening includes a first region with a constant inner diameter and a second region with a varying diameter, wherein a maximum diameter of the second region is greater than the constant inner diameter;

wherein the insertion sleeve is assembled on the rigid stiffener with the second region positioned closer to the first O-ring than the first region; and wherein the maximum diameter of the second region is greater than an outer diameter of the first O-ring.

2. The pipe coupling of claim 1, wherein the first groove is spaced apart from the second groove by a distance greater than a length of the first region.

3. The pipe coupling of claim 1, wherein the second section includes a first outer diameter and a second outer diameter greater than the first diameter, and wherein the second outer diameter is less than the maximum outer diameter.

4. The pipe coupling of claim 3, wherein a radial surface extends between the first section and the second section, and wherein the radial surface is configured to be contacted by the pipe.

5. The pipe coupling of claim 1, wherein the third section includes a first chamfer and the second region includes a second chamfer, and wherein the first chamfer and the second chamfer converge toward one another.

6. The pipe coupling of claim 1, wherein the first region extends at least partially across the second section and the first section.

7. The pipe coupling of claim 1, wherein the second region extends at least partially across the first section and the third section.

8. The pipe coupling of claim 1, further comprising a gripper with at least one tooth configured to contact an outer surface of the pipe, wherein the at least one tooth is formed at an incline with a first angle, wherein the third section is formed at an incline with a second angle, and wherein the first angle is equivalent to the second angle.

9. The pipe coupling of claim 1, wherein the second region is inclined relative to an outer surface of the rigid stiffener with an angle between 15° and 30°.

10. The pipe coupling of claim 1, wherein:

the first groove is spaced apart from the second groove by a distance greater than a length of the first region;

the second section includes a first outer diameter and a second outer diameter greater than the first diameter, and wherein the second outer diameter is less than the maximum outer diameter;

a radial surface extends between the first section and the second section, and wherein the radial surface is configured to be contacted by the pipe;

the first region extends at least partially across the second section and the first section; and the second region extends at least partially across the first section and the third section.

11. The pipe coupling of claim 1, wherein:

the maximum outer diameter of the body is equal to an outer diameter of the pipe; and a length of the body along an axial direction is less than the maximum outer diameter.

12. An insertion sleeve for use with a pipe coupling, wherein the insertion sleeve comprising:

a body having an outer surface and an opening passing through the body, wherein, the body includes a cylindrical first section disposed between a second section and a third section, the first section has a maximum outer diameter of the body, the second section having a varying diameter along an axial length, and the third section having a varying diameter along the axial length, the opening includes a first region with a constant inner diameter and a second region with a varying diameter, wherein a maximum diameter of the second region is greater than the constant inner diameter;

wherein the insertion sleeve is configured to be assembled along a rigid stiffener of the pipe coupling;

wherein the maximum diameter of the second region is configured to be greater than an outer diameter of an O-ring received on the rigid stiffener; and wherein the body is configured to be movably coupled to the rigid stiffener.

13. The insertion sleeve of claim 12, wherein the second section includes a first outer diameter and a second outer diameter greater than the first diameter, wherein the second outer diameter is less than the maximum outer diameter, wherein a radial surface extends between the first section and the second section, and wherein the radial surface is configured to be contacted by a pipe.

14. The insertion sleeve of claim 12, wherein the third section includes a first chamfer and the second region includes a second chamfer, and wherein the first chamfer and the second chamfer converge toward one another.

15. The insertion sleeve of claim 12, wherein the first region extends at least partially across the second section and the first section.

16. The insertion sleeve of claim 12, wherein the second region extends at least partially across the first section and the third section.

17. The pipe coupling of claim 12, wherein the second region is inclined relative to the first region with an angle between 15° and 30°.

18. The pipe coupling of claim 12, wherein:

the second section includes a first outer diameter and a second outer diameter greater than the first diameter, and wherein the second outer diameter is less than the maximum outer diameter;

a radial surface extends between the first section and the second section, and wherein the radial surface is configured to be contacted by the pipe;

the first region extends at least partially across the second section and the first section; and the second region extends at least partially across the first section and the third section.

19. The pipe coupling of claim 12, wherein:

a radial surface extends between the first section and the second section, the radial surface is oriented perpendicular to the first section;

the third section includes a first chamfer and the second region includes a second chamfer, and wherein the first chamfer and the second chamfer converge toward one another; and the second region is inclined relative to the first region with an angle between 15° and 30°.

20. The pipe coupling of claim 12, wherein the maximum diameter of the second region is greater than the axial length of the body measured between the second section and the third section.

* * * * *